United States Patent [19]

Peters

[11] Patent Number: 5,542,312

[45] Date of Patent: Aug. 6, 1996

[54] HAND CONTROL FOR VEHICLES

[76] Inventor: Bryan T. Peters, 1116 Elkins Dr., Auburn, Ala. 36830

[21] Appl. No.: 352,846

[22] Filed: Dec. 2, 1994

[51] Int. Cl.⁶ .............................. B60K 41/20; G05G 1/14
[52] U.S. Cl. .................. 74/481; 74/482; 180/333; 477/209
[58] Field of Search ............... 74/481, 482; 477/209; 180/320, 333; 24/306, 442

[56] References Cited

U.S. PATENT DOCUMENTS

| | | | |
|---|---|---|---|
| 2,481,966 | 9/1949 | Zivi | 74/481 |
| 2,777,335 | 1/1957 | Engberg et al. | 74/481 |
| 3,065,647 | 11/1962 | Whitmore | 74/481 |
| 4,177,807 | 12/1979 | Ocel et al. | 24/442 X |
| 4,324,309 | 8/1982 | Ginley | 74/481 X |
| 4,424,723 | 1/1984 | Gockel | 74/482 |
| 4,788,879 | 12/1988 | Ulrich | 74/481 |
| 4,946,013 | 8/1990 | Conlyn, Jr. et al. | 477/209 |
| 5,025,905 | 6/1991 | Lenz | 477/209 |
| 5,103,946 | 4/1992 | Masters et al. | 477/209 |
| 5,119,688 | 6/1992 | Snyder, Jr. | 74/482 |
| 5,121,651 | 6/1992 | Bristow | 74/481 |
| 5,129,492 | 7/1992 | Lenz et al. | 477/27 |

FOREIGN PATENT DOCUMENTS 1539880 2/1979 United Kingdom.

*Primary Examiner*—Charles A. Marmor
*Assistant Examiner*—Troy Grabow
*Attorney, Agent, or Firm*—Richard C. Litman

[57] ABSTRACT

A vehicle hand control assembly which, when installed on a motor vehicle, allows the user to control the brake pedal and the accelerator pedal with his hands. Two telescoping members are pivotally attached to a plate which is then secured to the individual pedal with a strap. The strap loops around the pedal and is then attached to the telescoping member with a hook and loop fastener in order to secure the strap, thereby allowing the user to easily install the device without reaching to the floor.

8 Claims, 4 Drawing Sheets

HAND CONTROL FOR VEHICLES

BACKGROUND OF THE INVENTION

1. Field of the Invention

The present invention relates to a hand control for the operation of the brake and accelerator pedals of a motor vehicle.

2. Description of the Prior Art

The use of hand controls to operate the accelerator and brake pedal of an automobile is well known. U.S. Pat. Nos. 3,065,647, issued to A. Whitmore on Nov. 27, 1962, 4,424, 723 issued to D. A. Gockel on Jan. 10, 1984, 4,788,879, issued to D. L. Ulrich on Dec. 6, 1988, and 5,121,651, issued to N. W. Bristow on Jun. 16, 1992 each show a type of hand control device for motor vehicles wherein two independent shafts engage the brake and accelerator pedals of an automobile and where the handle for each shaft is independent and freely engageable. All of the above patents refer to devices which require the operator to kneel or otherwise reach all the way down to the pedals to attach the device in an automobile.

U.S. Pat. Nos. 2,777,335 issued to W. M. Engberg et al. on Jan. 15, 1957, 4,946,013 issued to A. C. Conlyn, Jr. et al. on Aug. 7, 1990, 5,025,905 issued to C. R. Lenz on Jun. 25, 1991, and 5,129,492, issued to C. R. Lenz et al. on Jul. 14, 1992 illustrate the concept of a hand control for the brake and accelerator pedals, wherein each shaft that is connected to a pedal is also attached to a single, perpendicular shaft which acts as the control mechanism and operates both pedals.

U.S. Pat. No. 2,481,966 issued to H. L. Zivi on Sep. 13, 1949 and U. K. Patent No. 1,539,880, issued to E. Aston on Feb. 7, 1979, illustrate hand controls that only attach to, and operate, a single pedal. U.S. Pat. 5,103,946 issued to J. V. Masters et al. on Apr. 14, 1992 shows a handle structure that is attached to the steering column of a vehicle and operates the brake and accelerator pedals.

None of the above inventions and patents, taken either singly or in combination, is seen to describe the instant invention as claimed.

SUMMARY OF THE INVENTION

The present invention overcomes the above shortcomings by providing a hand control apparatus for motor vehicles which can be installed by the user even while in the normal, seated position in the vehicle and without having to reach to the pedals or to the floorboards of the vehicle and wherein attachment straps carried by extended shafts are remotely manipulated.

Accordingly, it is an object of the invention to provide a hand control apparatus for motor vehicles whereby the user may operate both the brake pedal and the accelerator pedal with either hand while a unitary control handle is cradled in their lap.

It is another object of the invention to provide a hand control apparatus for motor vehicles including telescopically adjustable shafts terminating in a slidable coupling, permitting operation of either shaft by either hand.

It is a further object of the invention to provide a hand control apparatus for motor vehicles including flexible pedal attachment straps of sufficient length and configuration to allow the user to attach the device while remaining in a normal seated position in the vehicle.

Still another object of the invention is to provide a hand control assembly for motor vehicles that is pivotally attached to the pedals to allow the device to be conveniently and comfortably positioned with respect to the operator of the vehicle.

An additional object of the invention is to provide a hand control apparatus for motor vehicles including hand controls which are operable by either hand and wherein the hand controls are contoured to rest comfortably in the lap of an operator of the motor vehicle.

Another object of the invention is to provide a hand control apparatus for motor vehicles having hand controls configured to allow the easiest transition of hand positions from the accelerator to the brake.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
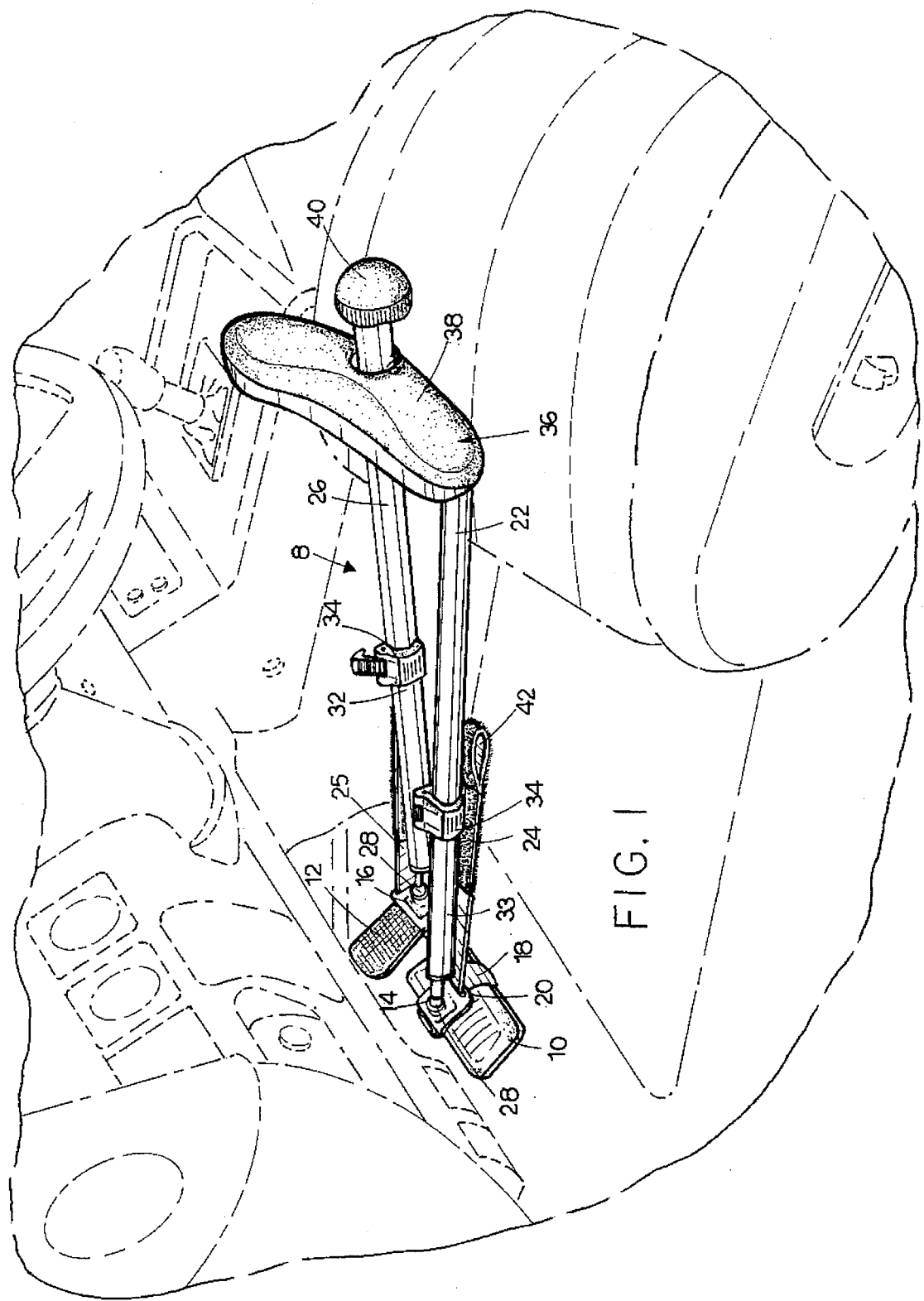
FIG. 1 is an environmental view of the invention in a vehicle.

Turning now to FIG. 1 of the drawings, a hand control apparatus 8 for motor vehicles is shown. The device is adapted to be used in any vehicle, by a person of any size. The apparatus is adjustable to fit any size or shape of a pedal, as well as being extendable to accommodate users of different heights.

The apparatus attaches to the brake pedal 10 and the accelerator pedal 12 by placing the attachment means, in the form of a brake plate 14 and an accelerator plate 16, in contact with their respective pedals. The brake plate 14 and the accelerator plate 16 each have a lip which engages the side of their respective pedal to hold the plate 14,16 in place. A flexible brake strap 18 is permanently attached to the lip of the brake plate 14. This strap 18 snares the brake pedal 10 and passes through a slot 20 in the lower portion of the brake plate 14. The flexible brake attachment strap 18 is pulled taut, securing the brake plate 14 to the brake pedal 10, and then the strap is secured to the main shaft of the brake control assembly 22 by means of a releasable hook and loop type fastener component 24. The flexible accelerator strap 25 secures the accelerator plate 16 to the accelerator in a similar manner, attaching the strap 25 to the main accelerator control assembly 26 with another hook and loop type fastener 24. The brake plate 14 is vertically disposed to engage the horizontally disposed brake pedal 10 from the side and the accelerator plate 16 is horizontally disposed to engaged the vertically disposed accelerator pedal 12 from the top.

Figure 2:
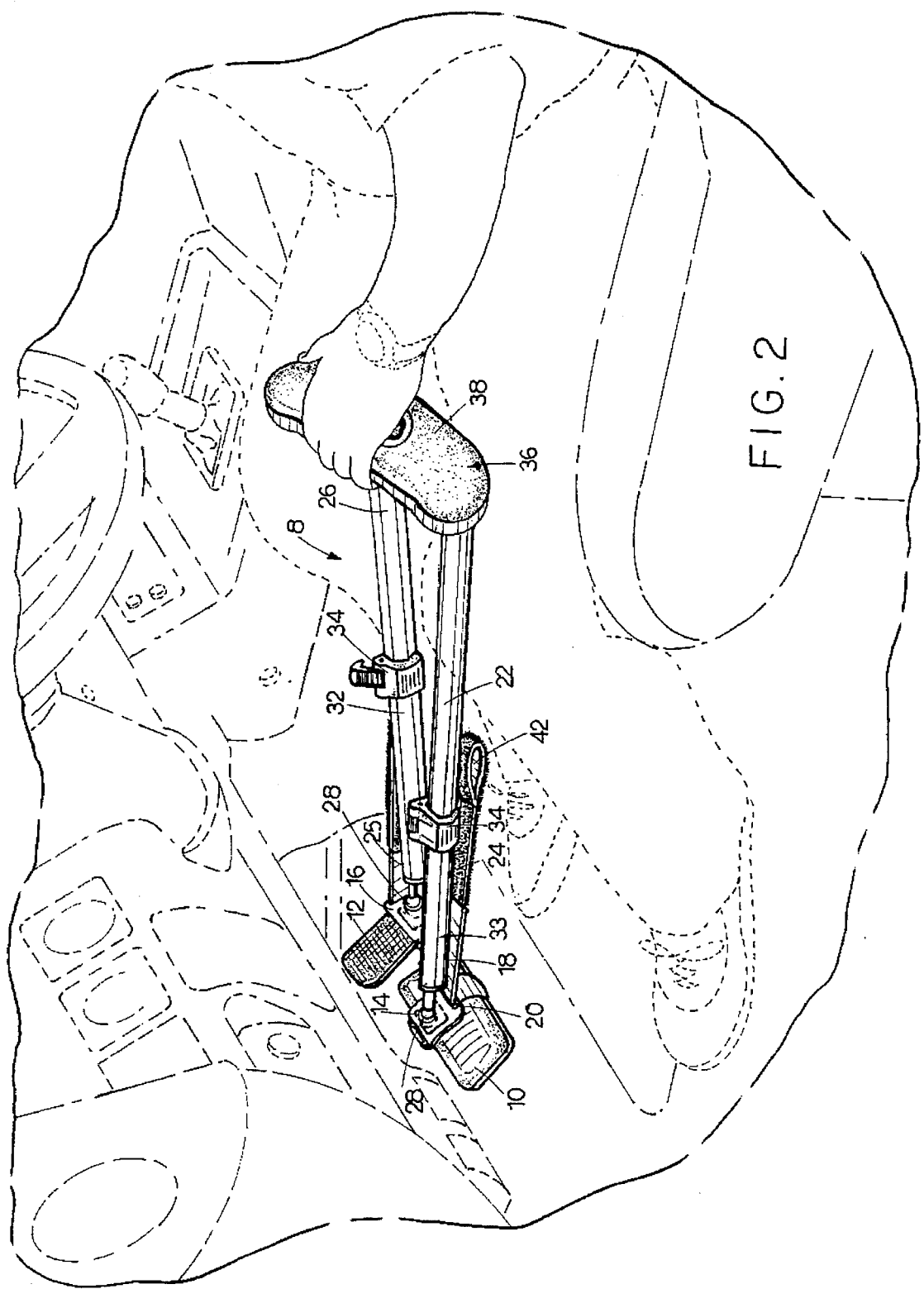
FIG. 2 is an environmental view of the invention in use by a person in a vehicle.

Attached to each plate 14,16 is a swivel joint 28, which connects to a rigid telescoping member 32,33. The telescoping members 32,33 have the same shape as the brake control assembly 22 and the accelerator control assembly 26, but have a smaller circumference, allowing the telescoping members 32,33 to slide inside their respective control assemblies 22,26. A friction clamp 34,34 is attached to the lower portion of each control assembly 22,26 to secure the telescoping members 32,33 in place, thus preventing the telescoping members 32,33 from sliding in or out at an inappropriate time. One clamp 34 attached to the accelerator control assembly 26 in FIG. 1 and FIG. 2 is shown in an open position for illustrative purposes.

The rear end of the brake control assembly 22 is attached to the elongated, generally kidney shaped handgrip 36. The assembly 22 passes through an aperture in the rear face of the handgrip 36 and is then rigidly secured within the handgrip 36, thereby allowing pressure applied to the brake control handle 38 to be directly applied to the brake control assembly 22, and hence, the brake pedal 10. The rear end of the accelerator control assembly 26 passes through a circular aperture in the center of the handgrip 36 and extends through both the rear and the front face, terminating in the accelerator control handle 40.

Figure 3:
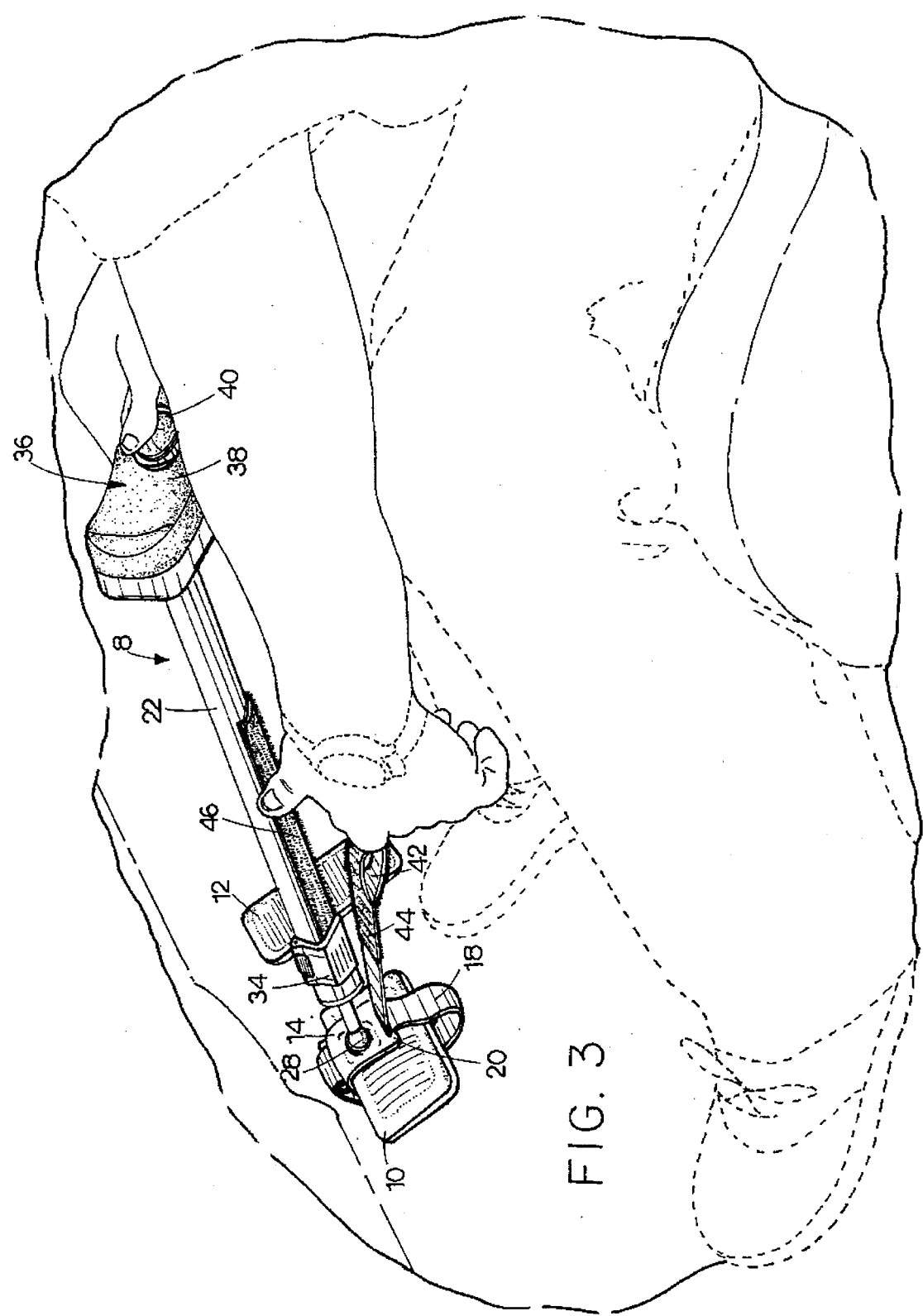
FIG. 3 is an environmental, partial view of the invention in a vehicle.

When installing the device in an automobile, the user will position himself comfortably in the seat and pass the flexible straps 18,25 over the brake 10 or accelerator 12 pedal, as illustrated in FIG. 3. This may be accomplished without having to bend forward to reach the pedals 10, 12. The user will then reach, without bending, to the free end of each flexible strap 18,25, and grasp the hand engageable section, or loop 42, and pull it taut, securing the strap 18,25 to the control assembly 22,26 by connecting the female portion of the hook and loop fastener 44 to the male portion 46.

After connecting each pedal assembly as aforesaid, the device is ready to be operated. The swivel joints 28,28 allow the handgrip 36 to be placed in a variety of positions in the lap of the user. Should the length of the device, or of an individual shaft 22,26, need to be adjusted, the clamp(s) 34 are opened, the apparatus is extended or contracted appropriately, and the clamp(s) 34 are then closed and secured.

Figure 4:
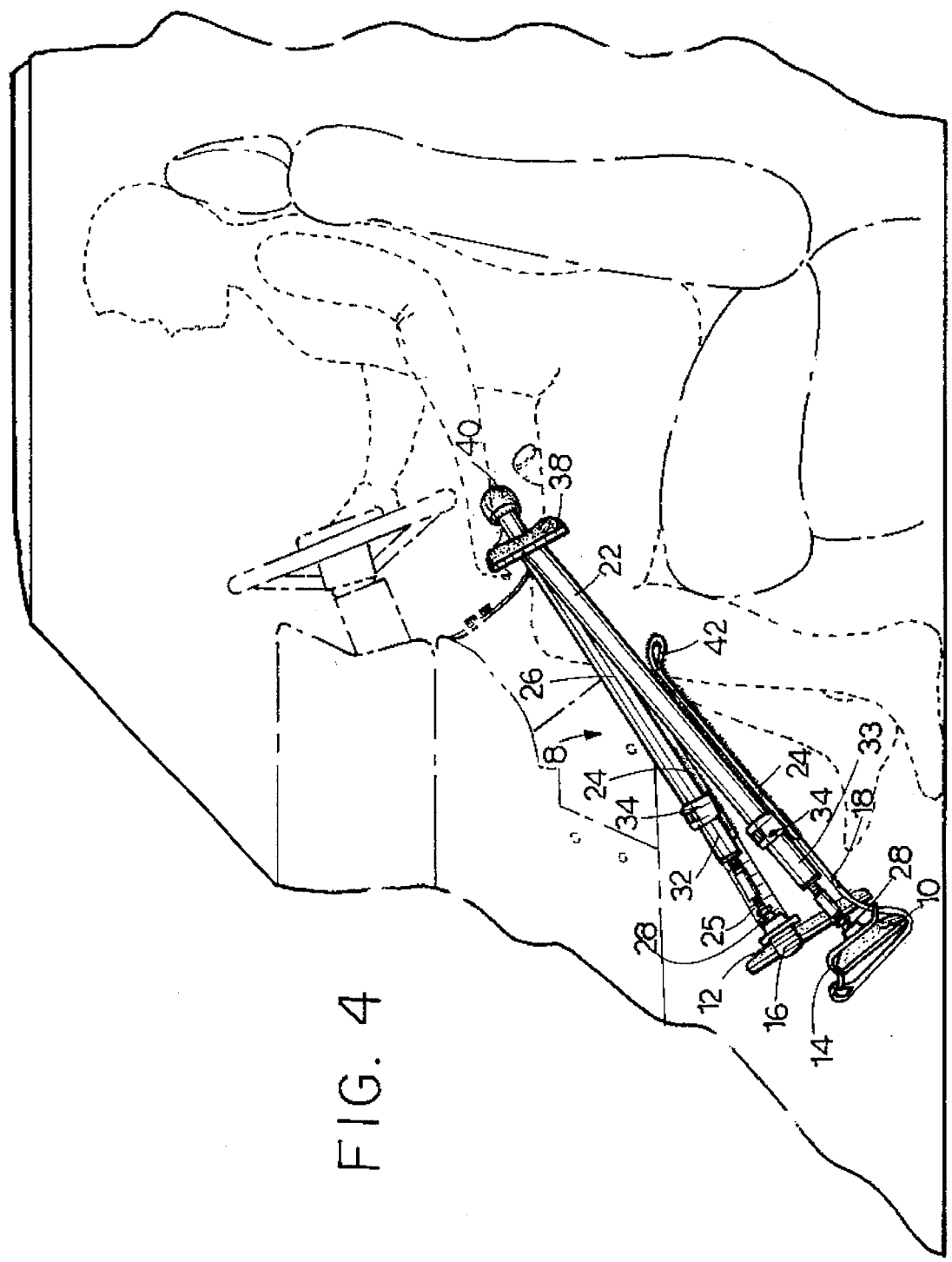
FIG. 4 is a environmental, side-elevational view of the invention in use.

Once the hand control apparatus 8 is installed and adjusted, the operator is ready to operate the controls of the vehicle. By placing either hand on the cushioned, engageable surface of the brake control pad 38 and applying pressure, the user will depress the brake pedal 10, as shown in FIG. 4. At the appropriate time, the user will release the brake control pad 38, which disengages the brake pedal 10, and then with either hand apply pressure to the engageable section of the accelerator control handle 40 to cause the accelerator pedal 12 to be depressed. In this manner the user has full control of the operational controls of a motor vehicle, even though the user may not have the use of one or both of his or her legs. While in use, the swivel joints 28 allow the operator to position the handgrip 36 in a variety of locations to maximize comfort and convenience It is to be understood that the present invention is not limited to the sole embodiment described above, but encompasses any and all embodiments within the scope of the following claims.

I claim:

1. A control apparatus for manually operating existing brake and accelerator pedals of a vehicle comprising:

an elongated handgrip adapted to be disposed transversely between the thighs of an operator seated in a vehicle and having rear and front faces;

a brake control assembly including a shaft having a rear end attached to said handgrip and a forward end supporting brake pedal attachment means, said handgrip provided with an aperture therethrough;

said brake pedal attachment means including a flexible brake attachment strap adapted to surround a brake pedal and being further provided with a free end defining a hand engageable section;

an accelerator control assembly including a shaft having a rear end slidably disposed through said handgrip aperture and a forward end supporting accelerator pedal attachment means, said accelerator shaft rear end terminating in a hand engageable surface projecting beyond said handgrip rear face;

said accelerator pedal attachment means including a flexible accelerator attachment strap adapted to surround an accelerator pedal and provided with a free end defining a hand engageable section;

a first releasable fastener component on said hand engageable section of said brake and accelerator attachment straps;

a second releasable fastener component on said shafts of said brake and accelerator control assemblies, and mating with said first releasable fastener components, said hand engageable sections of said brake and accelerator attachment straps are readily attached to and released from said shafts to retain said straps substantially continuous with said shafts with said hand engageable sections accessible to an operator while seated in a vehicle; and said attachment strap free ends extendible a substantial portion of the distance between said control assembly shaft forward and rear ends to allow a vehicle operator to install said pedal attachment means to respective brake and accelerator pedals by grasping said strap free end hand engageable sections while remaining seated in a vehicle; whereby brake and accelerator pedals of a vehicle may be manipulated with an operator grasping said handgrip between the thighs with either hand and applying the vehicle's brakes by pressing forward upon said handgrip, the vehicle's accelerator being actuated by an operator applying forward pressure upon said hand engageable surface on said accelerator shaft rear end.

2. A control apparatus according to claim 1, wherein said handgrip aperture extends substantially medially through said handgrip.

3. A control apparatus according to claim 1, wherein said handgrip is generally kidney shaped to rest upon the thighs of a vehicle operator.

4. A control apparatus according to claim 1, wherein said handgrip includes cushioning means on at least one said face.

5. A control apparatus according to claim 1, wherein each said first releasable fastener component and said second releasable fastener component includes mating hook and loop material.

6. A control apparatus according to claim 1, wherein said accelerator control assembly shaft and said brake control assembly shaft each comprise telescopically interfitting members, whereby the length of both said shafts may be individually adjusted.

7. A control apparatus according to claim 7, wherein said shafts are each provided with clamping means for securing the shaft components in an adjusted position and preventing said shaft components from moving with respect to each other.

8. A control apparatus according to claim 1, wherein said forward end of each said shaft connecting said brake and accelerator pedals to each respective control assembly is pivotally attached to said brake and accelerator plates to facilitate the adjustment of said control assembly with respect to an operator of a motor vehicle.

* * * * *